United States Patent
Okabe

(10) Patent No.: US 9,457,621 B2
(45) Date of Patent: *Oct. 4, 2016

(54) HEAVY DUTY PNEUMATIC TIRE

(71) Applicant: SUMITOMO RUBBER INDUSTRIES, LTD., Kobe-shi, Hyogo (JP)

(72) Inventor: Taro Okabe, Kobe (JP)

(73) Assignee: Sumitomo Rubber Industries, Ltd., Kobe-shi (JP)

(*) Notice: Subject to any disclaimer, the term of this patent is extended or adjusted under 35 U.S.C. 154(b) by 325 days.

This patent is subject to a terminal disclaimer.

(21) Appl. No.: 14/149,391

(22) Filed: Jan. 7, 2014

(65) Prior Publication Data

US 2014/0224397 A1 Aug. 14, 2014

(30) Foreign Application Priority Data

Feb. 8, 2013 (JP) ................................ 2013-023636

(51) Int. Cl.
*B60C 11/03* (2006.01)
*B60C 11/12* (2006.01)
*B60C 11/11* (2006.01)
*B60C 11/04* (2006.01)

(52) U.S. Cl.
CPC .......... *B60C 11/0306* (2013.04); *B60C 11/033* (2013.04); *B60C 11/125* (2013.04); *B60C 11/047* (2013.04); *B60C 2011/0346* (2013.04); *B60C 2011/0348* (2013.04); *B60C 2011/0353* (2013.04); *B60C 2011/0358* (2013.04); *B60C 2011/0365* (2013.04); *B60C 2011/0367* (2013.04); *B60C 2011/0372* (2013.04); *B60C 2200/06* (2013.04)

(58) Field of Classification Search
CPC ........... B60C 11/0306; B60C 11/0309; B60C 11/12; B60C 11/125; B60C 11/1204; B60C 11/1209; B60C 11/1218; B60C 11/1259; B60C 11/1263; B60C 11/1353; B60C 11/1369; B60C 2011/0358; B60C 2011/0362; B60C 2011/0367; B60C 2011/0369; B60C 2011/0374; B60C 2011/0379; B60C 2200/06; B60C 11/033; B60C 2011/0348; B60C 2011/0346; B60C 2011/0353; B60C 11/047; B60C 2011/0372; B60C 2011/0363
USPC ....................................... 152/209.18, 209.25
See application file for complete search history.

(56) References Cited

U.S. PATENT DOCUMENTS

2013/0160909 A1* 6/2013 Atake ................. B60C 11/0311
152/209.25

FOREIGN PATENT DOCUMENTS

JP 4783004 B2 7/2011

OTHER PUBLICATIONS

Extended European Search Report dated May 16, 2014, for European Application No. 14151559.3.

*Primary Examiner* — Eric Hug
(74) *Attorney, Agent, or Firm* — Birch, Stewart, Kolasch & Birch, LLP

(57) ABSTRACT

A heavy duty pneumatic tire includes a tread portion provided with at least one circumferentially and continuously extending main groove, and a plurality of lateral grooves to form circumferentially repeated pitch elements each of which consists of one lateral groove and a block element divided between two adjacent lateral grooves. The tread portion has a land ratio in a range of from 70% to 80%, and the pitch elements in a range of from 40 to 50. Each lateral groove has a circumferential groove width in a range of from 5% to 15% in relation to a circumferential length of the pitch element, and an angle in a range of from 45 to 85 degrees with respect to a circumferential direction of the tire.

10 Claims, 8 Drawing Sheets

HEAVY DUTY PNEUMATIC TIRE

BACKGROUND OF THE INVENTION

1. Field of the Invention

The present invention relates to a heavy duty pneumatic tire that may deliver high uneven wear resistance while maintaining wet performance.

2. Description of the Related Art

Japanese Patent No. 4783004 discloses a heavy duty pneumatic tire including a tread portion with a plurality of tread blocks that are divided by circumferentially extending main grooves and a plurality of lateral grooves. In order to improve wet performance of the tire above, it is known to increase the number of the main grooves and the lateral grooves so that a total groove volume on the tread portion increases.

However, such a pneumatic tire having large groove volume on the tread portion tends to have disadvantage of low uneven wear resistance, since the tread blocks easily slip against a road during traveling due to its low pattern rigidity. Especially, uneven wear such as heel and toe wear tends to occur on the tread blocks.

SUMMARY OF THE INVENTION

The present invention has been worked out in light of the circumstances described above, and has a main object of providing a heavy duty pneumatic tire that may deliver high uneven wear resistance while maintaining wet performance.

According to one aspect of the present invention, a heavy duty pneumatic tire includes a tread portion provided with at least one circumferentially and continuously extending main groove, and a plurality of lateral grooves to form circumferentially repeated pitch elements each of which consists of one lateral groove and a block element divided between two adjacent lateral grooves. The tread portion has a land ratio in a range of from 70% to 80%, and the pitch elements in a range of from 40 to 50. Each lateral groove has a circumferential groove width in a range of from 5% to 15% in relation to a circumferential length of the pitch element, and an angle in a range of from 45 to 85 degrees with respect to a circumferential direction of the tire.

In the aspect of the present invention, the block element may have an axial maximum width in a range of from 5% to 15% in relation to a tread width.

In the aspect of the present invention, the at least one main groove may comprise a pair of crown main grooves disposed both sides a tire equator, the lateral grooves may comprise a plurality of crown lateral grooves extending between the crown main grooves to form a plurality of crown blocks as the block elements, and each crown lateral groove may have the angle in a range of from 55 to 75 degrees with respect to the circumferential direction of the tire.

In the aspect of the present invention, the at least one main groove may further comprise a pair of shoulder main grooves each of which is positioned the nearest to a tread edge, and a pair of middle main grooves each of which is disposed between the crown main groove and the shoulder main groove, the lateral grooves may further comprise a plurality of axially outer middle lateral grooves extending between the middle main groove and the shoulder main groove to form a plurality of axially outer middle blocks as the block elements, and each axially outer middle lateral groove may have the angle in a range of from 55 to 75 degrees with respect to the circumferential direction of the tire.

In the aspect of the present invention, the lateral grooves may further comprise a plurality of axially inner middle lateral grooves extending axially inwardly of the tire from the middle main groove without reaching the crown main groove to form a plurality of axially inner middle block like elements, and each axially inner middle lateral groove may have the angle in a range of from 55 to 75 degrees with respect to the circumferential direction of the tire.

In the aspect of the present invention, the at least one crown lateral groove may include a first shallow bottom part having a depth smaller than that of the main groove.

In the aspect of the present invention, the first shallow bottom part may have a depth in a range of from 50% to 60% in relation to a groove depth of the main groove.

In the aspect of the present invention, at least one middle main groove may include a second shallow bottom part having a depth larger than that of the first shallow bottom part.

In the aspect of the present invention, the second shallow bottom part may have a depth in a range of from 20% to 45% in relation to a groove depth of the crown main groove.

In the aspect of the present invention, the at least one main groove may have a groove width in a range of from 3% to 12% in relation to a tread width.

DETAILED DESCRIPTION

An embodiment of the present invention will be explained below with reference to the accompanying drawings.

Figure 1:
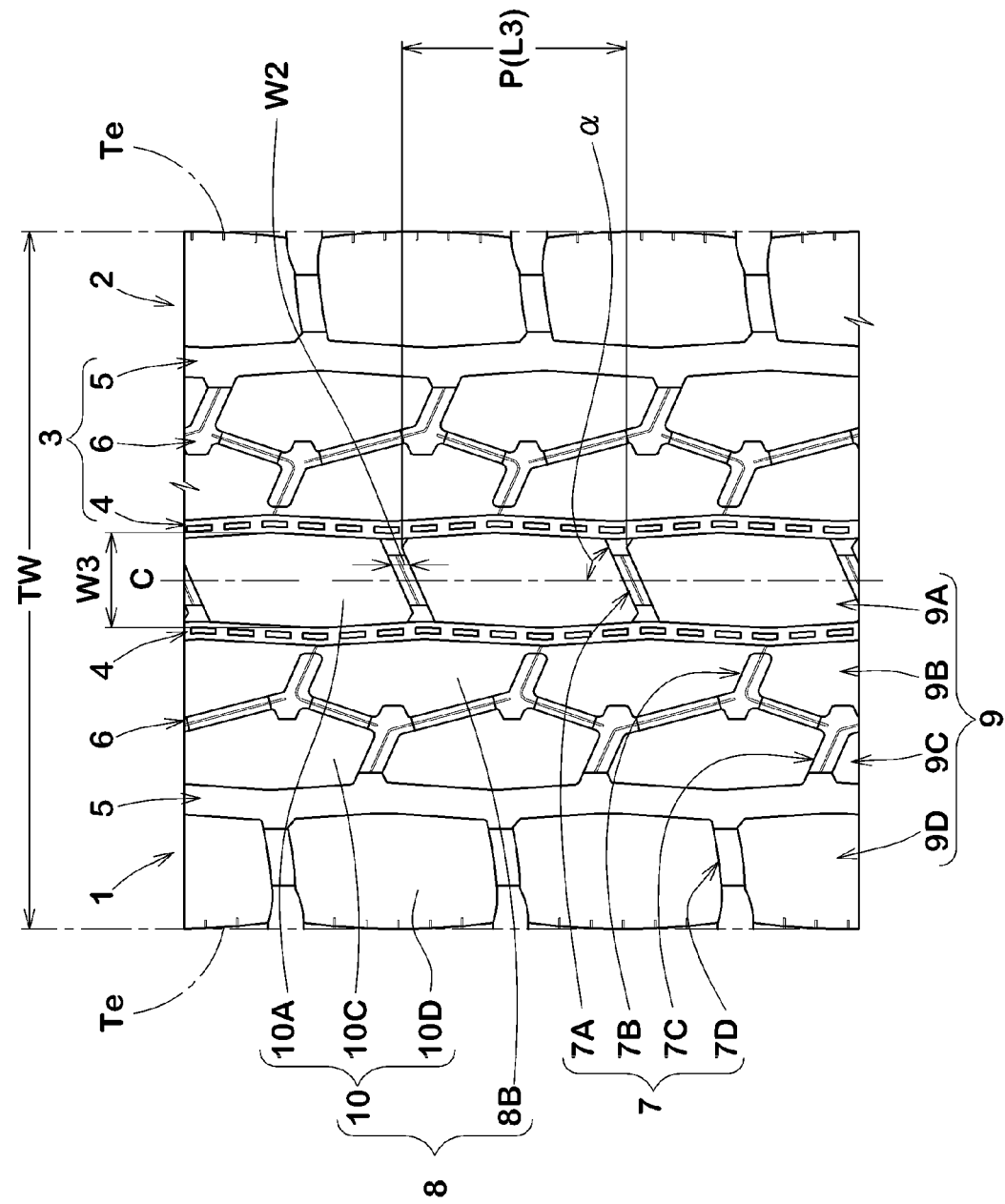
FIG. 1 is a development view of a tread portion of a heavy duty pneumatic tire in accordance with an embodiment of the present invention.

FIG. 1 shows a development view of a tread portion 2 of a heavy duty pneumatic tire 1 for trucks or busses in accordance with the present embodiment.

Referring to FIG. 1, the tread portion 2 is provided with at least one, preferably six circumferentially and continuously extending main grooves 3. In this embodiment, the main grooves 3 include a pair of crown main grooves 4 and 4 disposed both sides of a tire equator C, a pair of shoulder main grooves 5 and 5 disposed axially outside the crown main grooves 4 and 4 so as to position the nearest to tread edges Te and Te, and a pair of middle main grooves 6 and 6 each of which is disposed between the crown main groove 4 and the shoulder main groove 5. Thus, the tread portion 2 is divided into a plurality of land portions 9 that include a crown portion 9A between the crown main grooves 4 and 4, a pair of inner middle portions 9B each of which is between the crown main groove 4 and the middle main groove 6, a pair of outer middle portions 9C each of which is between the middle main groove 6 and the shoulder main groove 5, and a pair of shoulder portions 9D each of which is between the shoulder main groove 5 and the tread edge Te.

The tread edge Te is defined as an axially outer edge in a ground contact patch of the tread portion 2 under a standard loaded condition in which the tire 1 is mounted on a standard wheel rim with a standard pressure and is loaded with a standard tire load at a camber angle of set to zero. The axial distance between the tread edges Te and Te of the tire is defined as its tread width TW.

Here, the standard wheel rim is a wheel rim officially approved or recommended for the tire by standards organizations, i.e. JATMA, TRA, ETRTO, and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure and the standard tire load are the maximum air pressure and the maximum tire load for the tire specified by the same organization in the Air-pressure/Maximum-load Table or similar list.

The standard pressure is the "maximum air pressure" in JATMA, the "Inflation Pressure" in ETRTO, and the maximum pressure given in the "Tire Load Limits at Various Cold Inflation Pressures" table in TRA or the like.

The standard tire load is the "maximum load capacity" in JATMA, the "Load Capacity" in ETRTO, and the maximum value given in the above-mentioned table in TRA or the like.

In this application including specification and claims, various dimensions, positions and the like of the tire refer to those under a standard unloaded condition of the tire unless otherwise noted. The standard unloaded condition is such that the tire 1 is mounted on the standard wheel rim with the standard pressure and is loaded with no tire load.

Furthermore, the tread portion 2 is provided with a plurality of lateral grooves 7 that include a plurality of crown lateral grooves 7A extending between the crown main grooves 4 and 4, a plurality of inner middle lateral grooves 7B extending from the middle main groove 6 toward the crown main groove 4, a plurality of axially outer middle lateral grooves 7C extending between the middle main groove 6 and the shoulder main groove 5, and a plurality of shoulder lateral grooves 7D extending between the shoulder main groove 5 and the tread edge Te. Thus, the crown portion 9A is divided into a plurality of crown blocks 10A, the outer middle portion 9C is divided into a plurality of outer middle blocks 10C, and the shoulder portion 9D is divided into a plurality of shoulder middle blocks 10D. The inner middle portion 9B is configured to a circumferentially and continuously extending rib including circumferentially repeated inner middle block like elements 8B.

Preferably, the tread portion 2 has a land ratio in a range of from 70% to 80%, more preferably in a range of from 75% to 80%. Here, the land ratio of the tread portion 2 means a ratio "Sc/Sa" of a net ground contact area "Sc" to a gross total ground contact area "Sc" of the tread portion 2 obtained by plugging up the whole grooves. The tire 1 with the land ratio above may maintain preferable wet performance as well as the high pattern rigidity of the tread portion 2 that may prevent its large deformation during traveling, thereby offering low rolling resistance of the tire so that low fuel consumption is obtained.

The tread portion 2 includes circumferentially arranged repeated pitch elements P each of which consists of adjacently one lateral groove 9 and one block element 8 divided between the circumferentially adjacent lateral grooves 7. A typically block element 8 is configured to the tread block 10 including the crown block 10A, outer middle block 10C and the shoulder block 10D. Furthermore, the block element 8 may include a block like element that is not perfectly traversed by a lateral groove, but is identified as circumferentially repeated design land unit of the tread portion 2, same as a the circumferentially repeated inner middle block like elements 8B.

Preferably, the tread portion 2 includes the pitch elements P in a range of from 40 to 50. Namely, each land portions 9A, 9B, 9C and 9D include the pitch elements P in a range of from 40 to 50, respectively.

Thus, the tread portion 2 may maintain wet performance due to lateral edges on the lateral grooves 7 while offering high circumferential rigidity of each block element 8 that helps to improve low fuel consumption.

When the number of the pitch elements P is more than 50, uneven wear resistance of the tread portion 2 and fuel consumption of the tire tends to deteriorate due to low circumferential rigidity of each block element 8. When the number of the pitch elements P is less than 40, wet performance of the tire tends to deteriorate due to less lateral groove edges. More preferably, the tread portion 2 includes the pitch elements P in a range of from 42 to 48.

The lateral grooves 7 have its circumferential groove widths W2 in a range of from 5% to 15%, more preferably in a range of from 8% to 12%, in relation to the circumferential length L3 of the pitch element P. Thus, each block element 8 may have circumferentially long length to enhance its circumferential rigidity so as to prevent large amount of slip against the road during traveling, thereby offering high uneven wear resistance. Furthermore, since deformation of each block element 8 during traveling tends to reduce, the tire may deliver low fuel consumption by decreasing energy loss in the tread portion 2. Here the circumferential groove width W2 of the lateral groove 7 is measured at the ground contact surface of the tread portion 2. In the event that the circumferential groove width of the lateral groove 7 is irregular, the groove width W2 is defined as its circumferential maximum width.

Preferably, each of the crown block 10A, outer middle block 10C, shoulder block 10D and inner middle block like element 8B has its axial maximum width W3 in a range of from 5% to 15% in relation to the tread width TW. Thus, the circumferential rigidity of each tread block and the like may be enhanced, while maintaining wet performance of the tire. More preferably, the axial maximum width W3 above is set in a range of from 10% to 12% in relation to the tread width TW.

At least one, preferably each lateral groove 7 has an angle $\alpha$ in a range of from 45 to 85 degrees, more preferably in a range of from 55 to 75 degrees with respect to the circumferential direction of the tire. Since the block element 8 divided by the lateral groove above has inclined leading and trailing edges, these edges come into contact with a road with a time lag along the edges during traveling so that stress acting thereto is dispersed. Thus, each block element 8 may have high uneven wear resistance at its leading and trailing edges. Furthermore, each lateral groove 7 with the angle above may effectively disperse the water outside the tread portion by draining using its inclination, thereby improving wet performance. Accordingly, the tire 1 in accordance with the present embodiment may deliver high uneven wear resistance while maintaining wet performance.

Figure 2:
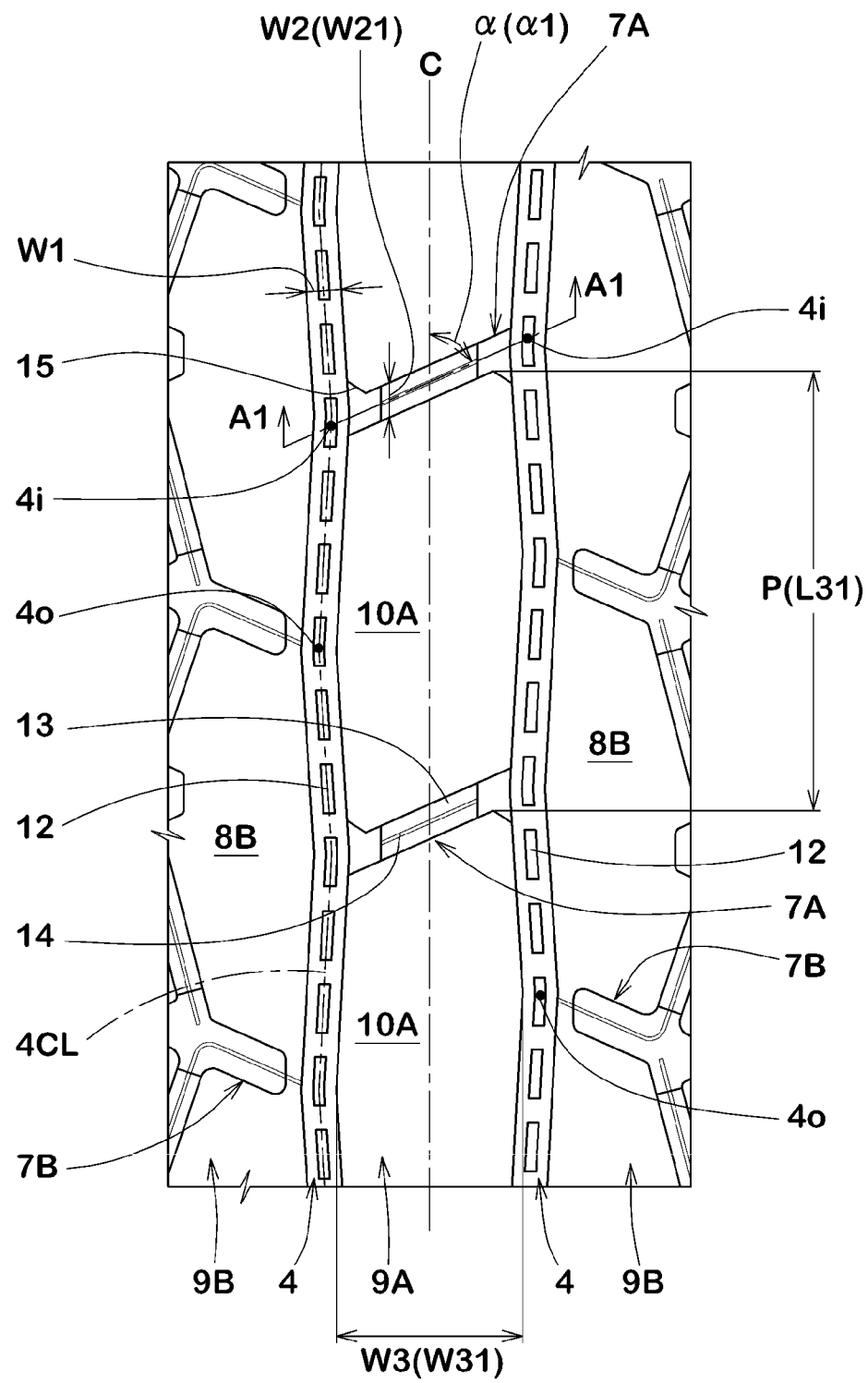
FIG. 2 is a partial enlarged view showing around a tire equator of the tread portion.

FIG. 2 shows a partial enlarged view of the crown portion 9A of the tread portion 2. Referring to FIG. 2, each of the crown main grooves 4 and 4 is configured to a zigzag form with small zigzag amplitude, and includes an axially innermost protruding portion 4i and an axially outermost protruding portion 4o. Regarding the zigzag phase of the crown main grooves 4, the one is shifted with respect to the other at a circumferential distance. The crown main grooves 4 may improve not only wet performance, but also traction force of the tire using its lateral edge components.

Each crown main groove 4 preferably has its groove width W1 in a range of from 3% to 12%, more preferably in a range of from 5% to 10% in relation to the tread width TW. When the groove width W1 is more than 12% in relation to the tread width TW, uneven wear resistance and fuel consumption performance may be deteriorated due to low tread rigidity. When the groove width W1 is less than 3% in relation to the tread width TW, drainage performance may be deteriorated due to low tread rigidity.

Figure 3:
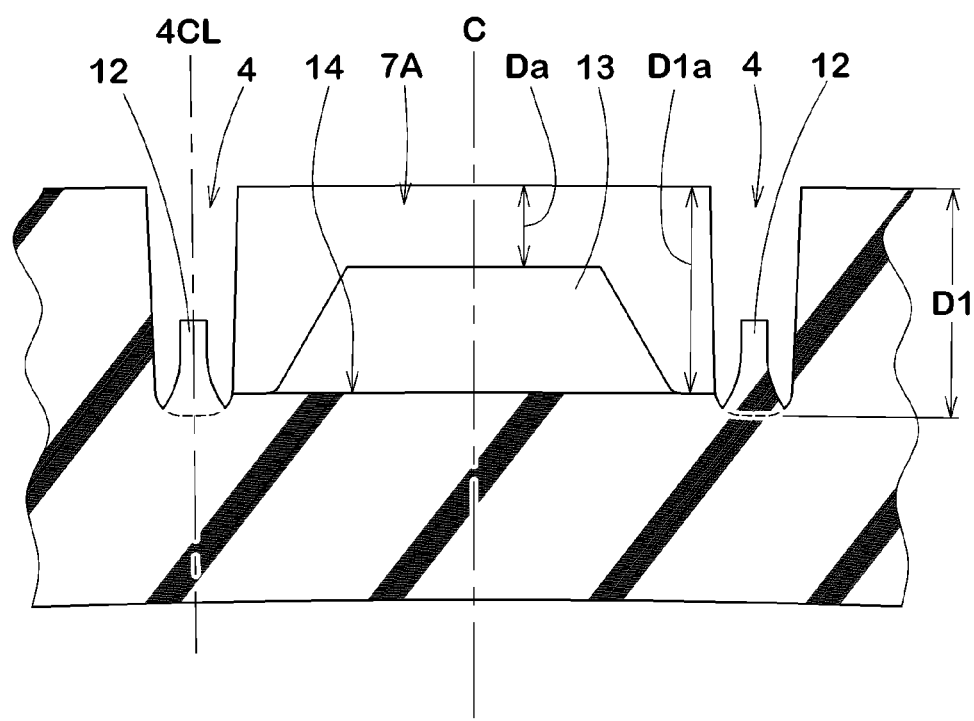
FIG. 3 is a cross sectional view taken along a line A1-A1 in FIG. 2.

FIG. 3 shows a cross sectional view taken along a line A1-A1 in FIG. 2. Referring to FIG. 3, each crown main groove 4 preferably has its maximum groove depth D1 in a range of from 5% to 8% in relation to the tread width TW.

Referring back to FIG. 2, each crown main groove 4 is provided with a plurality of protrusions 12 protruding radially outwardly of the tire along the groove centerline 4CL on its bottom for avoiding stone-biting thereto. Each protrusion 12 is configured to a circumferentially long rectangular shape in a plan view, for example. Such protrusions 12 may prevent stone-biting into the crown main grooves 4 while maintaining wet performance.

Each crown lateral groove 7A extends in a straight form so as to couple between the respective axially innermost protruding portions 4i and 4i of the crown main grooves 4 and 4. Thus, the respective crown blocks 10A are configured to have an axial width increasing toward its circumferential central region, thereby improving the circumferential rigidity of the crown block 10A.

The crown block 10A preferably has a circumferentially long rectangular shape in a plan view having its circumferential length larger than its axial width W31, in order to reduce energy loss generated in the crown block 10A and to improve high uneven wear resistance, by preventing its large deformation during traveling.

The crown block 10A is provided with a chamfer portion 15 at a corner portion having an acute angle between the crown lateral groove 7A and the crown main groove 4. The chamfer portion 15 may prevent the corner portion above from chipping. Furthermore, the chamfer portion 15 may disturb the air flow passing through the crown main groove 4 so that the resonance noise at the crown main groove 4 is reduced.

Each crown lateral groove 7A is inclined at an angle $\alpha 1$ in a range of from 45 to 85 degrees, more preferably in a range of from 55 to 75 degrees with respect to the circumferential direction of the tire, in order to improve wet performance, traction force and steering stability with well balance. In order to further improve the advantage above, the crown lateral groove 7A preferably has its circumferential width W21 in a range of from 5% to 10% in relation to the circumferential length L31 of the pitch element P.

Preferably, the crown lateral groove 7A includes a first shallow bottom part 13 having a depth smaller than that of the crown main grooves 4.

Referring to FIGS. 2 and 3, the first shallow bottom part 13 connects the adjacent crown blocks 10A and 10A for enhancing circumferential pattern rigidity of the crown portion 9A. Thus, uneven wear resistance of each crown block 10A may be further improved. Furthermore, since the first shallow bottom part 13 may reduce the deformation of the crown blocks 10A during traveling, low fuel consumption of the tire may be offered by decreasing rolling resistance of the blocks.

Referring to FIG. 3, the first shallow bottom part 13 preferably has its depth Da in a range of 50% to 60%, more preferably 52% to 58%, in relation to the maximum groove depth D1 of the crown main groove 4, in order to further improve the advantage above. When the depth Da of the first shallow bottom part 13 is less than 50% in relation to the maximum groove depth D1 of the crown main groove 4, the pattern rigidity of the crown portion 9A tends to be decreased. When the depth Da of the first shallow bottom part 13 is more than 60% in relation to the maximum groove depth D1 of the crown main groove 4, wet performance of the tire tends to be deteriorated. Referring to FIGS. 2 and 3, the first shallow bottom part 13 is provided with a groove bottom sipe 14 that extends along the groove centerline of the crown lateral groove 7A, for example. The groove bottom sipe 13 may deform during traveling of the tire so as to expand the groove width W2 of the crown lateral groove 7A, thereby further improving wet performance of the tire. Furthermore, since the groove bottom sipe 14 may come into contact on the ground at the last stage of wear of the tread portion 2, the edges of the groove bottom sipe 14 may help to improve the wet performance.

In order to further improve the advantage above, the groove bottom sipe 14 preferably has the depth $D1a$ in a range of from 85% to 100%, more preferably in a range of from 90% to 95% in relation to the maximum groove depth D1 of the crown main groove 4. When the depth $D1a$ of the groove bottom sipe 14 is less than 85% in relation to the maximum groove depth D1 of the crown main groove 4, the wet performance of the tire at the last stage of wear may be deteriorated. When the depth $D1a$ of the groove bottom sipe 14 is more than 100% in relation to the maximum groove depth D1 of the crown main groove 4, uneven wear resistance of the crown portion 9A may be deteriorated due to low circumferential pattern rigidity of the crown portion 9A.

Figure 4:
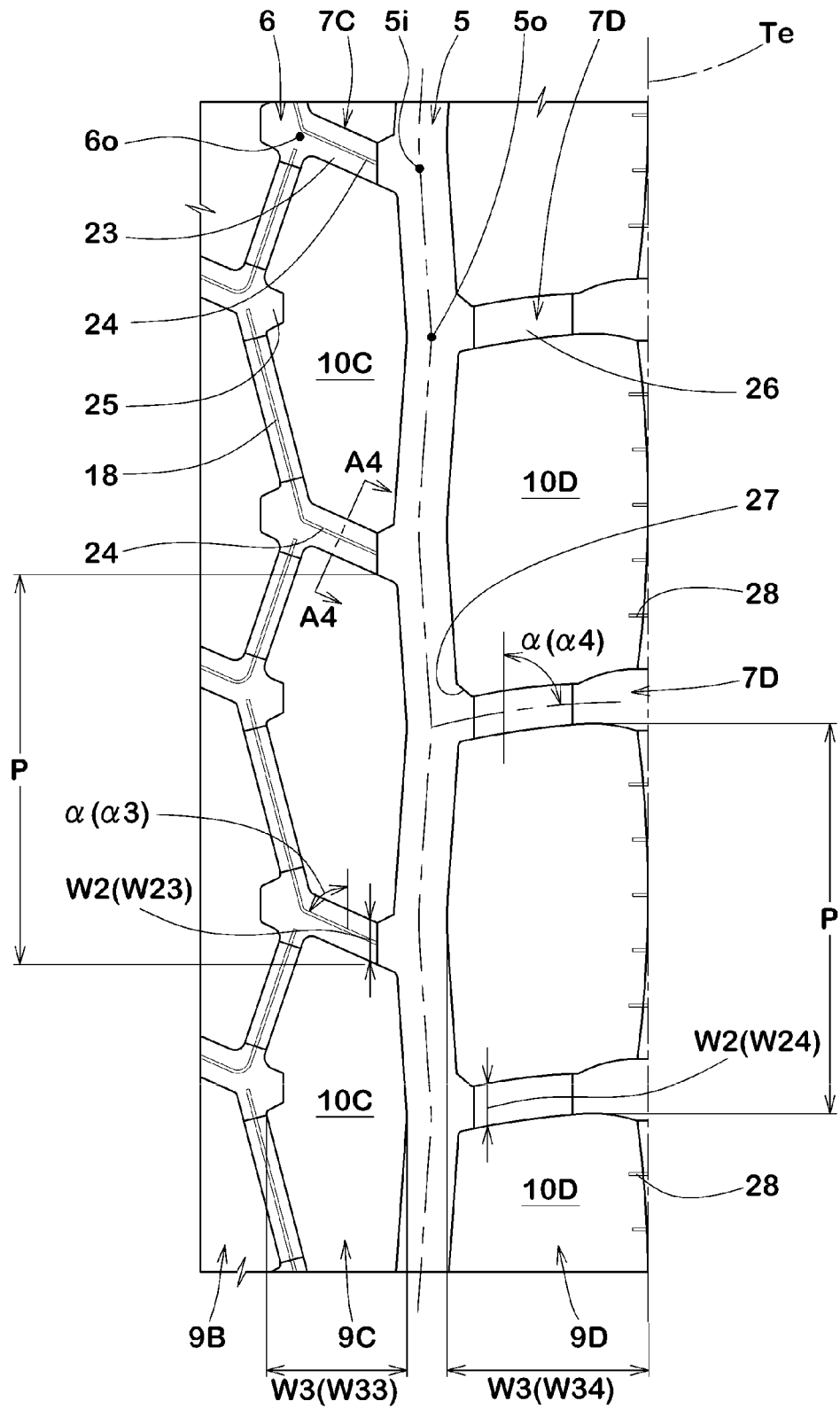
FIG. 4 is a partial enlarged view showing around a tread edge of the tread portion.

FIG. 4 shows a partial enlarged view of the shoulder portion 9D. Referring to FIG. 4, the shoulder main groove 5 is configured to a zigzag form with small zigzag amplitude, and includes an axially innermost protruding portion 5i and an axially outermost protruding portion 5o. The shoulder main grooves 5 may improve not only wet performance, but also traction force of the tire using its lateral edge components.

In order to further improve the advantage above, the shoulder main groove 5 preferably has its groove width in a range of from 3% to 12%, more preferably in a range of from 5% to 10% in relation to the tread width TW, same as the groove width W1 of the crown main groove 4. Furthermore, the shoulder main groove 5 has its maximum groove depth in the same range with the groove depth D1 of the crown main groove 4.

The shoulder lateral groove 7D extends from the axially outermost protruding portion 5o of the shoulder main groove 5 to the tread edge Te, while inclining at an angle $\alpha 4$ with respect to the circumferential direction of the tire. In this embodiment, the angle $\alpha 4$ of the shoulder lateral groove is larger than those of the lateral grooves 7A, 7B and 7C. Thus, the shoulder block 10D may improve steering stability of the tire due to its high lateral rigidity. Preferably, the angle $\alpha 4$ of the shoulder lateral groove 7D is set in a range of from 70 to 85 degrees with respect to the circumferential direction of the tire. Furthermore, the shoulder lateral groove 7D preferably has its circumferential groove width W24 in a range of from 8% to 12% in relation to the circumferential length L3 of the pitch element P, in order to further improve the advantage above.

The shoulder lateral grooves 7D includes a third shallow bottom part 26 having its depth smaller than the groove depth D1 of the crown main grooves 4 for connecting the adjacent shoulder blocks 10D and 10D. Thus, deformation of the shoulder blocks 10D during traveling may be reduced, thereby decreasing rolling resistance of the tire. The third shallow bottom part 26 preferably has its axial length in a range of 30% to 60% in relation to the axial width of the shoulder lateral groove 7D, in order to maintain wet performance as well as steering stability of the tire. In the same point of view, the shallow bottom part 25 is preferably provided at the axially inner region of the shoulder lateral groove 7D.

In a plan view, the shoulder block 10D has a circumferentially long rectangular shape having its circumferential length larger than its axial width W34. Thus, since the shoulder block 10D may have high circumferential rigidity, high uneven wear resistance, low fuel consumption, traction performance, and steering stability of the tire may be improved. Preferably, the shoulder block 10D is provided with a chamfer portion 27 at a corner portion having an acute angle between the shoulder lateral groove 7D and the shoulder main groove 5. The chamfer portion 32 may improve chipping resistance of the shoulder block 10D.

The shoulder block 10D is further provided with a plurality of semi-opened shoulder sipes 28 that extends axially inwardly of the tire from the tread edge Te in a short length so as to have axially inner ends without reaching the shoulder main groove 5. The shoulder sipes 28 may further improve uneven wear resistance of the shoulder block 10D by offering its softened axially outer edge.

Figure 5:
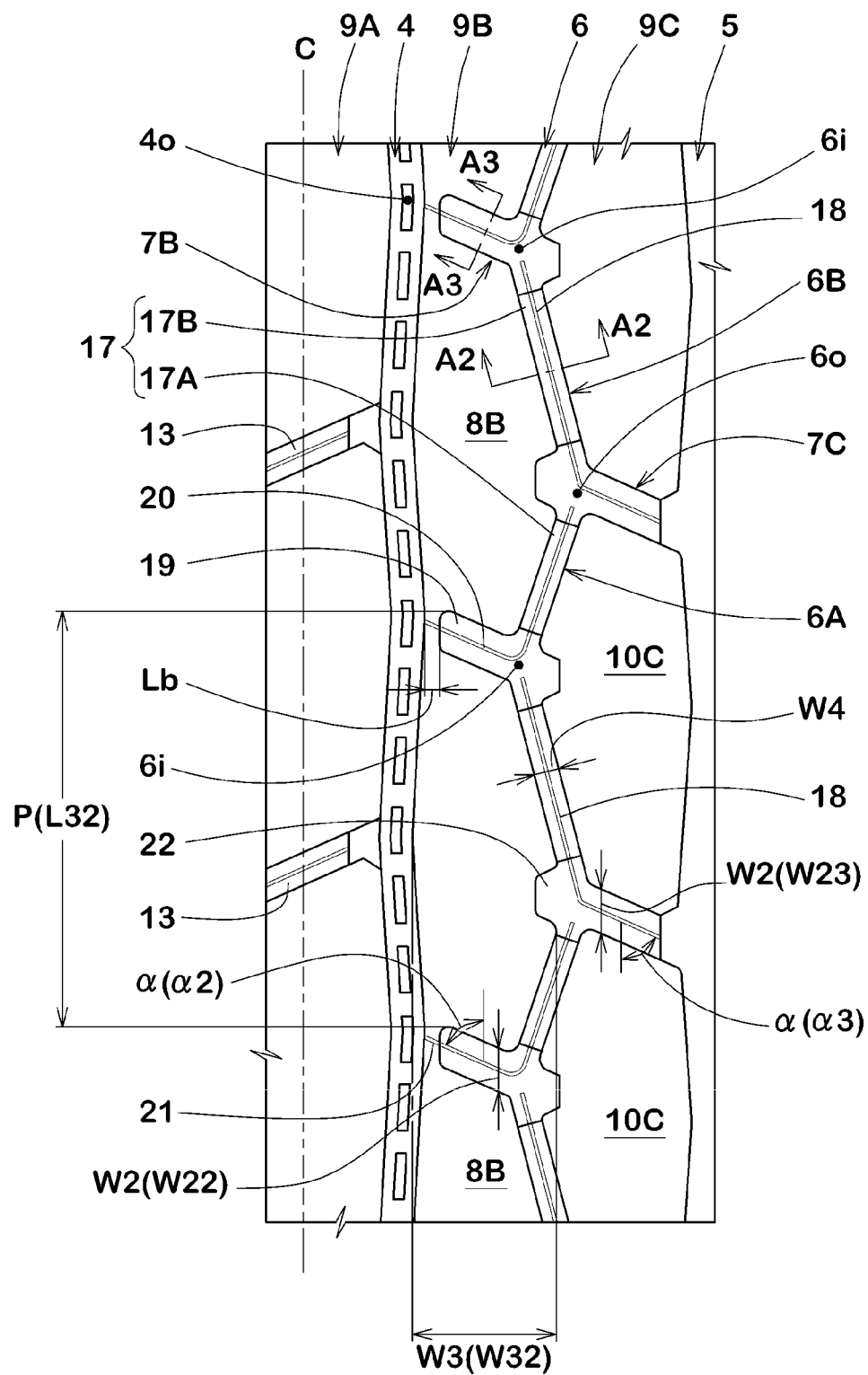
FIG. 5 is a partial enlarged view around a middle main groove.

FIG. 5 shows a partial enlarged view of the inner and outer middle portions 9B and 9C. Referring to FIG. 5, the middle main groove 6 is configured to a zigzag form including an axially innermost protruding portion 6i and an axially outermost protruding portion 6o.

In this embodiment, the middle main groove 6 has the relatively larger zigzag amplitude than those of the crown and shoulder main grooves 4 and 5. Furthermore, the middle main groove 6 alternately includes a short inclined element 6A, and a long inclined element 6B having its circumferential length larger than that of the short inclined element 6A. Since the middle main groove 6 tends to have lateral edge components with well balance, wet performance as well as traction performance may be further improved. In order to improve the advantage above, the middle main groove 6 preferably has its groove width W4 in a range of from 1% to 3% in relation to the tread width TW.

Figure 6:
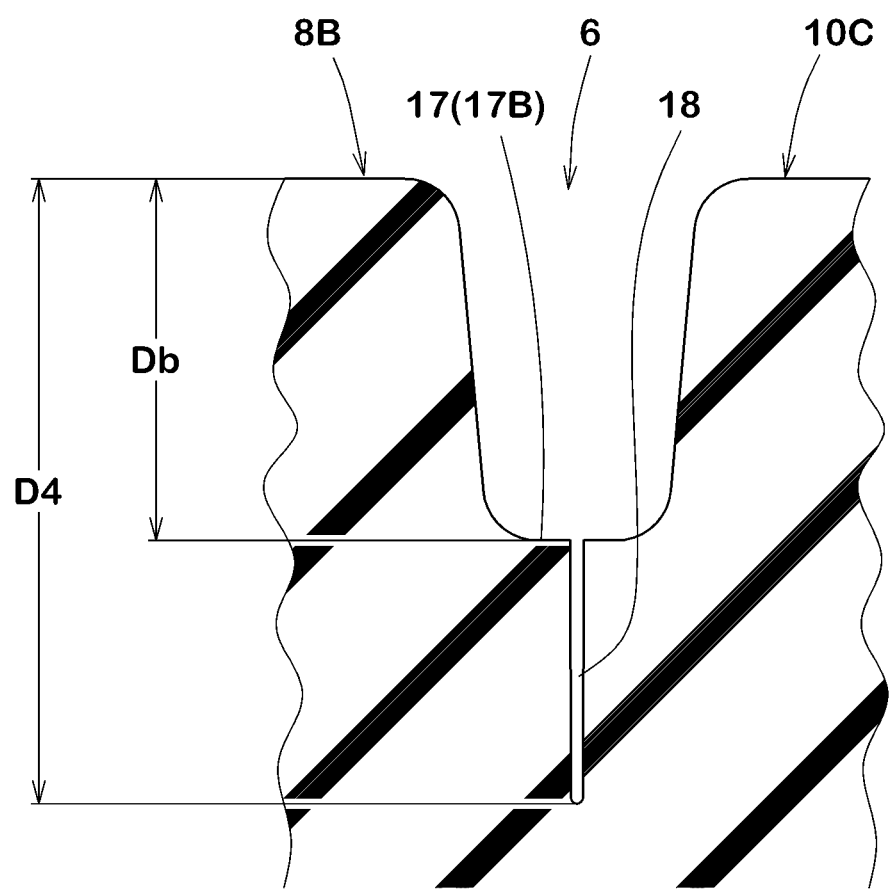
FIG. 6 is a cross sectional view taken along a line A2-A2 in FIG. 5.

FIG. 6 shows a cross sectional view taken along a line A2-A2 in FIG. 5. Referring to FIGS. 5 and 6, the middle main groove 6 is provided with a second shallow bottom part 17 having a depth smaller than the depth Da (shown in FIG. 3) of the first shallow bottom part 13 of the first crown main groove 4.

The second shallow bottom part 17 of the middle main groove 6 connects the inner middle portion 9B with the outer middle portion 9C so that the pattern rigidity of the tread portion 2 is enhanced. Since the energy loss in the inner and outer middle portions 9B and 9C is reduced, low fuel consumption of the tire may be effectively achieved.

Generally, the ground contact pressure acting on the inner middle portion 9B and the outer middle portion 9B is relatively smaller than that of the crown portion 9A. Thus, the inner middle portion 9B and the outer middle portion 9B tend to slip against the road during traveling, as compared to the crown portion 9A. However, since the tire 1 in accordance with the present embodiment has the second shallow bottom part 17 with the depth Db as mentioned above, the slip above may be effectively prevented while allowing suitable deformation of the inner middle portion 9B and the outer middle portion 9B. In order to further improve the advantage, the second shallow bottom part 17 preferably has the depth Db in a range of from 20% to 45%, more preferably in a range of from 20% to 40% in relation to the groove depth D1 of the main groove 3.

Referring to FIG. 5, the second shallow bottom part 17 preferably includes a short shallow bottom part 17A disposed on the short inclined element 6A, and a long shallow bottom part 17B disposed on the long inclined element 6B having a circumferential length larger than that of the short shallow bottom part 17A. Furthermore, the long shallow bottom part 17B has its depth deeper than that of the short shallow part 17A. Thus, the circumferential rigidity of the inner and outer middle portions 9B and 9C may uniformly be enhanced.

The short shallow bottom part 17A and the long shallow bottom part 17B are provided with groove bottom sipes 18 that extend along the groove centerline of the middle main groove 6. The groove bottom sipe 18 may deform during traveling of the tire so as to expand the groove width W4 of the middle main groove 6, thereby further improving wet performance of the tire. Furthermore, since the groove bottom sipe 18 may come into contact on the ground at the last stage of wear of the tread portion 2, its sipe edges may help to improve wet performance.

Referring to FIG. 6, in order to further improve the advantage above, the groove bottom sipe 18 preferably has the depth D4 in a range of from 85% to 100%, more preferably in a range of from 90% to 95% in relation to the maximum groove depth D1 (shown in FIG. 3) of the crown main groove 4. When the depth D4 of the groove bottom sipe 18 is more than 100% in relation to the maximum groove depth D1 of the crown main groove 4, uneven wear resistance of the tire may be deteriorated, since the relatively large deformation may occur on the inner and outer middle portions 9B and 9C during traveling. When the depth D4 of the groove bottom sipe 18 is less than 85% in relation to the maximum groove depth D1 of the crown main groove 4, the wet performance of the tire at the last stage of wear may be deteriorated.

Referring to FIG. 5, each axially inner middle lateral groove 7B extends from the axially innermost protruding portion 6i of the middle main groove 6 toward the axially outermost protruding portion 4o of the crown main groove 4, while inclining at an angle α2 with respect to the circumferential direction of the tire. Thus, the axial width of the inner block like element 8B increases toward its circumferential center region from both ends of the inner block like element 8B.

The axially inner middle lateral groove 7B terminates without communicating with the crown main groove 4. Thus, the inner middle portion 7B subjected to large ground contact pressure as compared to the outer middle portion 7C is configured to a circumferentially extending rib, thereby maintaining high uneven wear resistance and straight stability. Here, the rib of the tread portion 2 means a land portion that continuously extending in the circumferential direction of the tire without any lateral groove that entirely traverses the land portion. However, the rib may include at least one sipe having a width not more than 1.5 mm that entirely traverses thereon. Since the inner middle portion 9B formed as the rib tends to have its high circumferential and lateral rigidity, uneven wear resistance, fuel consumption performance, straight running stability, and steering stability, may be improved.

Furthermore, since the air compressed by the crown main groove 4 during traveling does not flow into the axially inner middle lateral groove 7B, noise during traveling may be reduced. Preferably, the axial distance Lb between the inner end of the axially inner middle lateral groove 7B and the crown main groove 4 is set in a range of from 1.3% to 2.5% in relation to the tread width TW. Preferably, the inner middle lateral groove 7B has the circumferential groove width W22 in a range of from 8% to 12% in relation to the circumferential length L32 of the pitch element P.

The inner middle lateral groove 7B is preferably inclined at the angle $\alpha2$ in a range of from 55 to 75 degrees with respect to the circumferential direction of the tire, in order to smoothly disperse the water along its inclination.

Figure 7:
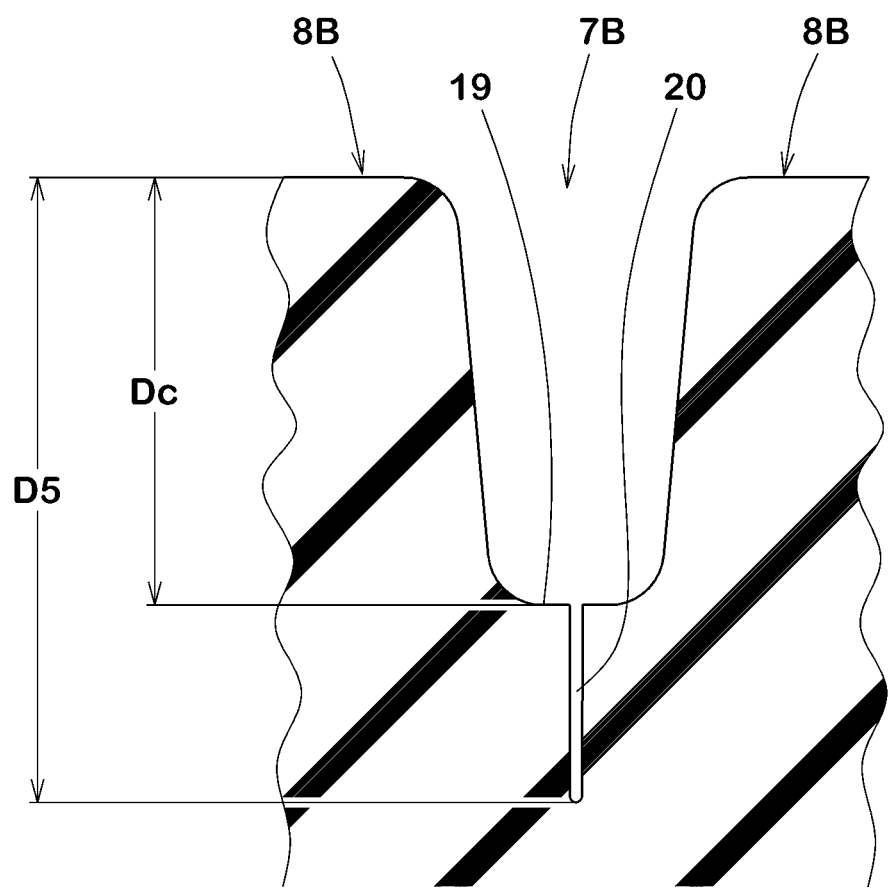
FIG. 7 is a cross sectional view taken along a line A3-A3 in FIG. 5.

FIG. 7 shows a cross sectional view taken along a line A3-A3 in FIG. 5. Referring to FIG. 7, the inner middle lateral groove 7B includes an inner shallow bottom part 19 having a depth smaller than the groove depth D1 of the crown main groove 4 for enhancing rigidity of the axially inner middle portion 9B.

The inner shallow bottom part 19 of the inner middle lateral groove 7B is connected with the second shallow bottom part 17 of the middle main groove 6. For more details, the inner shallow bottom part 19 extends between the short shallow bottom part 17A and the long shallow bottom part 17B. The inner shallow bottom part 19 preferably has its depth Dc larger than the depth Db of the second shallow bottom part 17, but smaller than the groove depth D1 of the crown main groove 4, in order to improve high uneven wear resistance, low fuel consumption and wet performance of the tire.

Referring back to FIG. 5, the inner shallow bottom part 19 of the axially inner middle lateral groove 7B is provided with an inner groove bottom sipe 20 that extends along the groove centerline of the axially inner middle lateral groove 7B, for example. The inner groove bottom sipe 20 may deform during traveling of the tire so as to expand the groove width W2 of the inner middle lateral groove 7B, thereby improving wet performance of the tire. Furthermore, since the inner groove bottom sipe 20 may come into contact on the ground at the last stage of wear, its sipe edges may help to improve the wet performance.

The axially inner groove bottom sipe 20 preferably has an axially outer end that is connected with the middle main groove 6. In this embodiment, the inner groove bottom sipe 20 is connected with the groove bottom sipe 18 of the short shallow bottom part 17A at the axially innermost portion 6i of the middle main groove 6. Furthermore, the inner middle portion 9B is provided with a sipe 21 connecting the inner middle groove bottom sipe 20 with the crown main groove 4. The sipe 21 may help to lower the rigidity of the inner middle portion 9B so as to prevent stress concentration thereto. Furthermore, the sipe 21 tends to effectively expand the groove width W2 of the inner middle lateral groove 7B during traveling.

Referring to FIG. 7, the axially inner groove bottom sipe 20 preferably has the depth D5 in a range of from 85% to 100%, more preferably in a range of from 90% to 95%, in relation to the maximum groove depth D1 of the crown main groove 4.

Referring to FIG. 4, the outer middle lateral groove 7C extends from the axially outermost protruding portions 6o of the middle main groove 6 to the axially innermost protruding portion 5i of the shoulder main groove 5, while inclining parallel to the inner middle lateral groove 7B.

The outer middle lateral groove 7C preferably has the angle $\alpha3$ in a range of from 55 to 75 degrees with respect to the circumferential direction of the tire. Such the outer middle lateral groove 7C may improve wet performance by dispersing the water toward the axially outside of the tire along its inclination. In order to improve the advantage above, the outer middle lateral groove 7C preferably has the circumferential groove width W23 in a range of from in a range of from 8% to 12% in relation to the circumferential length L3 of the pitch element P.

Referring back to FIG. 4, the outer middle block 10C has a circumferentially long hexagonal shape protruding axially inwardly and having its circumferential length larger than its axial width W33. The outer middle block 10C with high circumferential rigidity may further improve uneven wear resistance, fuel consumption, traction performance, and steering stability of the tire.

In this embodiment, a recess 25 is disposed on the axially outer middle block 10C. The recess 25 extends axially outwardly of the tire in a short length from the axially innermost protruding portion 6i of the middle main groove 6. The recess 25 may further improve wet performance as well as chipping resistance of the axially outer middle block 10C.

Figure 8:
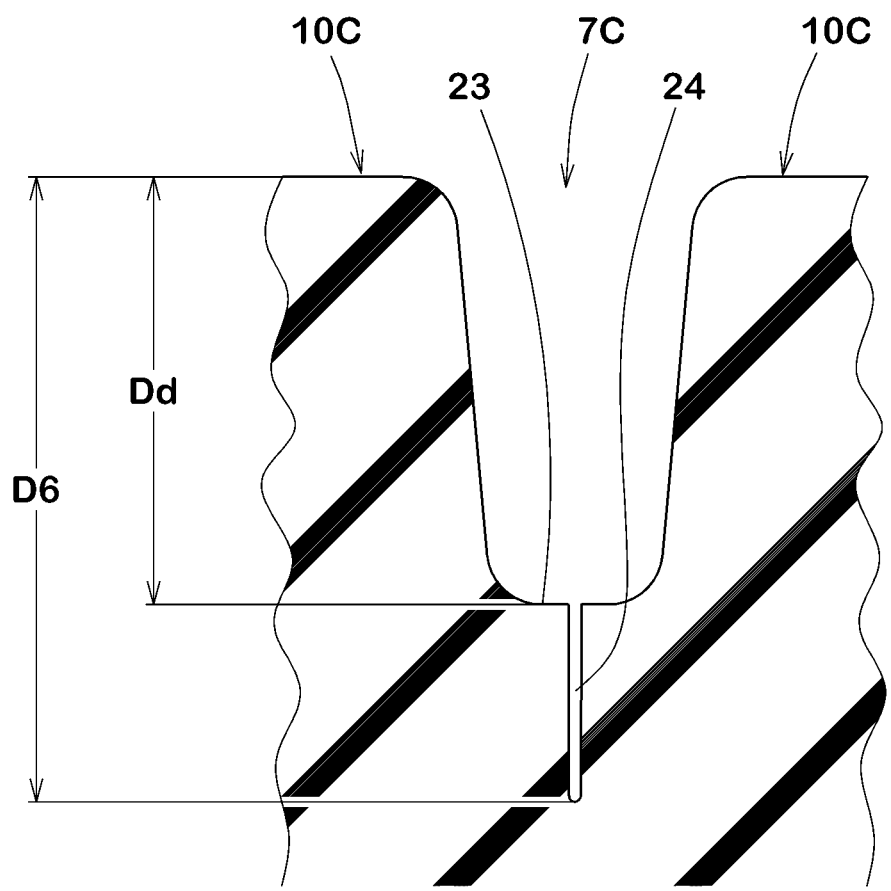
FIG. 8 is a cross sectional view taken along a line A4-A4 in FIG. 4.

FIG. 8 shows a cross sectional view taken along a line A4-A4 in FIG. 4. The outer middle lateral groove 7C includes an outer shallow bottom part 23 having its depth smaller than the groove depth D1 of the crown main grooves 3A for connecting the adjacent axially outer middle blocks 10C. Thus, deformation of the outer middle blocks 10C during traveling may be reduced, thereby further improving uneven wear resistance.

Referring back to FIG. 4, the outer shallow bottom part 23 of the outer middle lateral groove 7C preferably is connected with the second shallow bottom part 17 of the middle main groove 6, and has its depth Dd (shown in FIG. 8) in the same range with the depth of the inner shallow bottom part 19, in order to further improve uneven wear resistance, low fuel consumption, and wet performance of the tire.

The outer shallow bottom part 23 of the outer middle lateral groove 7C is provided with an outer groove bottom sipe 24 that extends along the groove centerline of the axially outer middle lateral groove 7C, for example. The outer groove bottom sipe 24 may deform during traveling of the tire so as to expand the groove width W2 of the axially outer middle lateral groove 7C, thereby improving wet performance of the tire. Furthermore, since the axially outer groove bottom sipe 24 may come into contact on the ground at the last stage of wear, its sipe edges may help to improve the wet performance. In order to further improve the advantage above, the outer groove bottom sipe 24 preferably has the depth D6 (shown in FIG. 8) in the same range of the depth of the inner groove bottom sipe 20.

The axially outer groove bottom sipe 24 preferably has an axially inner end being connected with the groove bottom sipe 18 at the axially outermost portion 6o of the middle main groove 6. More preferably, the axially outer groove bottom sipe 24 is connected with the groove bottom sipe 18 on the long inclined element 6B in order to expand the groove width W4 of the middle main groove 6. The outer groove bottom sipe 24 preferably has the depth D6 (shown in FIG. 8) in the same range of the depth of the inner groove bottom sipe 20.

In this embodiment, the third shallow bottom part 26 of the shoulder lateral groove 7D is not provided with any groove bottom sipe. Thus, the rigidity of the shoulder portion 9D may be effectively enhanced so that high uneven wear resistance thereon and low fuel consumption may be further achieved.

The present invention is more specifically described and explained by means of the following Examples and References. It is to be understood that the present invention is not limited to these Examples and embodiments described above.

Comparison Test

Heavy duty pneumatic tires shown in FIG. 1 and Table 1 were manufactured and tested. Major common specifics of the tires and test methods are as follows.

Details of Test Tires:
 Tire size: 275/80R22.5
 Rim: 22.5×7.5
 Internal pressure: 900 kPa
 Tread width TW: 248 mm
 Crown main groove width W1: 6 mm
 Crown main groove maximum depth D1: 16 mm Uneven Wear Resistance Test:

The test tire was installed in a 2-D truck with a full load to its carrying capacity 10 tons, as its front wheels. Then, uneven wear of the test tire was measured after 30,000 km traveling. The test results were indicated using an index based on Ex. 1 being 100 in Table 1. The larger the index, the better the uneven wear resistance is.

Fuel Consumption Performance Test (Rolling Resistance Test):

Rolling resistance of each test tire was measured under the following condition, using a tester. The test results were evaluated as the reciprocal of the rolling resistance and were indicated using an index based on Ex. 1 being 100 in Table 1. The larger the index, the better the rolling resistance is.
 Tire load: 33.83 kN
 Speed: 80 km/h Wet Performance Test:

The test tires with 80% worn were installed in a 2-D truck with a full load to its carrying capacity 10 tons, as its whole wheels. Then, a test driver suddenly started the truck using the second gear position by engaging its clutch at the timing of a 1,500 rpm engine speed on a wet asphalt road with a puddle 5 mm deep, and measured the time for traveling to 10 m distance. The test results were evaluated as the reciprocal of the time and were indicated using an index based on Ex. 1 being 100 in Table 1. The larger the index, the better the wet performance is.

Test results are shown in Table 1. From the test results, it was confirmed that Example tires in accordance with the present invention can be effectively improved uneven wear resistance while maintaining wet performance.

TABLE 1

|  | Ref. 1 | Ref. 2 | Ref. 3 | Ref. 4 | Ref. 5 | Ref. 6 | Ref. 7 | Ref. 8 | Ex. 1 | Ex. 2 | Ex. 3 |
| --- | --- | --- | --- | --- | --- | --- | --- | --- | --- | --- | --- |
| Land ratio (%) | 65 | 85 | 78 | 78 | 78 | 78 | 78 | 78 | 78 | 70 | 75 |
| Number of pitch elements | 45 | 45 | 38 | 52 | 43 | 43 | 43 | 43 | 45 | 45 | 45 |
| Ratio (W2/L3) (%) | 5 | 5 | 5 | 5 | 3 | 20 | 5 | 5 | 5 | 5 | 5 |
| Lateral groove angle α (deg.) | 57 | 57 | 57 | 57 | 57 | 57 | 40 | 90 | 57 | 57 | 57 |
| Ratio (W1/TW) (%) | 7.5 | 7.5 | 7.5 | 7.5 | 7.5 | 7.5 | 7.5 | 7.5 | 7.5 | 7.5 | 7.5 |
| Ratio (Da/D1) (%) | 55 | 55 | 55 | 55 | 55 | 55 | 55 | 55 | 55 | 55 | 55 |
| Ratio (Db/D1) (%) | 40 | 40 | 40 | 40 | 40 | 40 | 40 | 40 | 40 | 40 | 40 |
| Ratio (W3/TW) (%) | 12 | 12 | 12 | 12 | 12 | 12 | 12 | 12 | 12 | 12 | 12 |
| Uneven wear resistance (Index) | 95 | 100 | 95 | 95 | 100 | 95 | 95 | 95 | 100 | 98 | 100 |
| Rolling resistance (Index) | 95 | 100 | 100 | 95 | 100 | 95 | 100 | 100 | 100 | 98 | 100 |
| Wet performance (Index) | 100 | 95 | 95 | 100 | 95 | 100 | 95 | 100 | 100 | 100 | 100 |
|  | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
| Land ratio (%) | 80 | 78 | 78 | 78 | 78 | 78 | 78 | 78 | 78 | 78 | 78 |
| Number of pitch elements | 45 | 40 | 42 | 48 | 50 | 43 | 43 | 43 | 43 | 43 | 43 |
| Ratio (W2/L3) (%) | 5 | 5 | 5 | 5 | 5 | 10 | 15 | 5 | 5 | 5 | 5 |
| Lateral groove angle α (deg.) | 57 | 57 | 57 | 57 | 57 | 57 | 57 | 45 | 50 | 80 | 85 |
| Ratio (W1/TW) (%) | 7.5 | 7.5 | 7.5 | 7.5 | 7.5 | 7.5 | 7.5 | 7.5 | 7.5 | 7.5 | 7.5 |
| Ratio (Da/D1) (%) | 55 | 55 | 55 | 55 | 55 | 55 | 55 | 55 | 55 | 55 | 55 |
| Ratio (Db/D1) (%) | 40 | 40 | 40 | 40 | 40 | 40 | 40 | 40 | 40 | 40 | 40 |
| Ratio (W3/TW) (%) | 12 | 12 | 12 | 12 | 12 | 12 | 12 | 12 | 12 | 12 | 12 |
| Uneven wear resistance (Index) | 100 | 98 | 100 | 100 | 98 | 100 | 98 | 98 | 100 | 100 | 98 |
| Rolling resistance (Index) | 100 | 100 | 100 | 100 | 98 | 100 | 98 | 100 | 100 | 100 | 98 |
| Wet performance (Index) | 100 | 98 | 100 | 100 | 100 | 100 | 100 | 98 | 100 | 100 | 100 |
|  | Ex. 15 | Ex. 16 | Ex. 17 | Ex. 18 | Ex. 19 | Ex. 20 | Ex. 21 | Ex. 22 | Ex. 23 | Ex. 24 |
| Land ratio (%) | 78 | 78 | 78 | 78 | 78 | 78 | 78 | 78 | 78 | 78 |
| Number of pitch elements | 43 | 43 | 43 | 43 | 43 | 43 | 43 | 43 | 43 | 43 |
| Ratio (W2/L3) (%) | 5 | 5 | 5 | 5 | 5 | 5 | 5 | 5 | 5 | 5 |
| Lateral groove angle α (deg.) | 57 | 57 | 57 | 57 | 57 | 57 | 57 | 57 | 57 | 57 |
| Ratio (W1/TW) (%) | 3 | 5 | 10 | 12 | 7.5 | 7.5 | 7.5 | 7.5 | 7.5 | 7.5 |
| Ratio (Da/D1) (%) | 55 | 55 | 55 | 55 | 50 | 60 | 55 | 55 | 55 | 55 |
| Ratio (Db/D1) (%) | 40 | 40 | 40 | 40 | 40 | 40 | 20 | 45 | 60 | 60 |
| Ratio (W3/TW) (%) | 12 | 12 | 12 | 12 | 12 | 12 | 12 | 12 | 5 | 15 |
| Uneven wear resistance (Index) | 100 | 100 | 100 | 98 | 98 | 100 | 98 | 100 | 98 | 100 |
| Rolling resistance (Index) | 100 | 100 | 100 | 98 | 98 | 100 | 98 | 100 | 98 | 100 |
| Wet performance (Index) | 98 | 100 | 100 | 98 | 100 | 98 | 98 | 98 | 100 | 98 |

What is claimed is:

1. A heavy duty pneumatic tire comprising:
a tread portion provided with at least one circumferentially and continuously extending main groove and a plurality of lateral grooves to form circumferentially repeated pitch elements each of which consists of one lateral groove and a block element divided between two adjacent lateral grooves, wherein the at least one main groove extends in a zigzag form including a first inclined element and a second inclined element, and wherein the first inclined element is provided with a first groove bottom sipe, and the second inclined element is provided with a second groove bottom sipe, and wherein the first groove bottom sipe and the second groove bottom sipe are not in communication with each other,
the tread portion having a land ratio in a range of from 70% to 80% and the pitch elements in a range of from 40 to 50, and
each lateral groove having a circumferential groove width in a range of from 5% to 15% in relation to a circumferential length of the pitch element and an angle in a range of from 45 to 85 degrees with respect to a circumferential direction of the tire.

2. The tire according to claim 1,
wherein the block element has an axial maximum width in a range of from 5% to 15% in relation to a tread width.

3. The tire according to claim 1,
wherein the at least one main groove comprises a pair of crown main grooves disposed on both sides of a tire equator,
the lateral grooves comprise a plurality of crown lateral grooves extending between the crown main grooves to form a plurality of crown blocks as the block elements, and
each crown lateral groove has the angle in a range of from 55 to 75 degrees with respect to the circumferential direction of the tire.

4. The tire according to claim 3,
wherein the at least one main groove further comprises a pair of shoulder main grooves each of which is positioned the nearest to a tread edge and a pair of middle main grooves each of which is disposed between the crown main groove and the shoulder main groove on each side of the tire equator,
the lateral grooves further comprise a plurality of axially outer middle lateral grooves extending between the middle main groove and the shoulder main groove to form a plurality of axially outer middle blocks as the block elements on each side of the tire equator, and
each axially outer middle lateral groove has the angle in a range of from 55 to 75 degrees with respect to the circumferential direction of the tire.

5. The tire according to claim 4,
wherein the lateral grooves further comprise a plurality of axially inner middle lateral grooves extending axially inwardly of the tire from the middle main groove without reaching the crown main groove to form a plurality of axially inner middle block like elements on each side of the tire equator, and
each axially inner middle lateral groove has the angle in a range of from 55 to 75 degrees with respect to the circumferential direction of the tire.

6. The tire according to claim 3,
wherein at least one crown lateral groove includes a first shallow bottom part having a depth smaller than those of the crown main grooves.

7. The tire according to claim 6,
wherein the first shallow bottom part has a depth in a range of from 50% to 60% in relation to a groove depth of the crown main grooves.

8. The tire according to claim 6,
wherein at least one middle main groove includes a second shallow bottom part having a depth smaller than that of the first shallow bottom part.

9. The tire according to claim 8,
wherein the second shallow bottom part has a depth in a range of from 20% to 45% in relation to a groove depth of the crown main grooves.

10. The tire according to claim 1,
wherein the at least one main groove has a groove width in a range of from 3% to 12% in relation to a tread width.

* * * * *